(12) United States Patent
Walter

(10) Patent No.: US 7,717,692 B2
(45) Date of Patent: May 18, 2010

(54) MULTIPLE EXTRUSION HEAD

(75) Inventor: Ulrich Walter, Lohmar (DE)

(73) Assignee: W. Müller GmbH (DE)

( * ) Notice: Subject to any disclaimer, the term of this patent is extended or adjusted under 35 U.S.C. 154(b) by 0 days.

(21) Appl. No.: 12/140,383

(22) Filed: Jun. 17, 2008

(65) Prior Publication Data

US 2009/0011062 A1 Jan. 8, 2009

(30) Foreign Application Priority Data

Jul. 2, 2007 (DE) .................. 10 2007 030 677

(51) Int. Cl.
*B29C 47/30* (2006.01)
(52) U.S. Cl. .................... 425/382 R; 425/464
(58) Field of Classification Search ............. 425/382 R, 425/464

See application file for complete search history.

(56) References Cited

U.S. PATENT DOCUMENTS

| | | | | |
|---|---|---|---|---|
| 3,381,336 A | * | 5/1968 | Wells | 425/378.2 |
| 3,561,053 A | * | 2/1971 | Pearson | 425/192 R |
| 3,767,347 A | * | 10/1973 | Landoni | 425/378.2 |
| 5,922,362 A | * | 7/1999 | Schippers et al. | 425/72.2 |
| 6,099,790 A | | 8/2000 | Wehrens et al. | |

FOREIGN PATENT DOCUMENTS

| | | |
|---|---|---|
| DE | 1 479 130 | 4/1969 |
| DE | 2114465 | 10/1972 |
| DE | 28 47 627 | 7/1979 |
| DE | 197 03 492 | 8/1998 |
| DE | 197 49 626 | 5/1999 |
| GB | 1113340 | 5/1968 |

\* cited by examiner

*Primary Examiner*—Robert B Davis
*Assistant Examiner*—Joseph Leyson
(74) *Attorney, Agent, or Firm*—Harness, Dickey & Pierce, P.L.C.

(57) ABSTRACT

A multiple extrusion head (1) for blow molding extrusion machines has a plurality of first extrusion heads (2) fixedly arranged side by side in a first row forming a first plane (3). A plurality of second extrusion heads (4) are fixedly arranged side by side in a second row forming a second plane (5) that extends parallel to the first plane (3). Per row, distributing devices (6, 6a, 6b) are provided with first distributing channels (7, 10) that are arranged in the first plane (3) and the second plane (5), respectively. The distributing devices (6a, 6b) are separated in the region of the first plane (3) and second plane (5). A third distributing device (15) is provided with third distributing channels (18) that are arranged in a third plane (16) extending at a right angle relative to the first plane (3) and to the second plane (5).

6 Claims, 3 Drawing Sheets

MULTIPLE EXTRUSION HEAD

CROSS-REFERENCE TO RELATED APPLICATION

This application claims priority to German Patent Application No. 102007030677.8. filed Jul. 2, 2007, which application is herein expressly incorporated by reference.

FIELD

The disclosure relates to a multiple extrusion head for blow molding extrusion machines and, more particularly, to distribute plastic masses to the individual extrusion heads which are fed by an extruder.

BACKGROUND

DE-OS 21 14 465 describes a device that uniformly distributes plasticized plastics from an extruder to a plurality of blow or injection heads. The device includes a distributor block where parallel channels are arranged in one plane. A first channel is connected to two channels that extend parallel to the first channel. The two channels each feed two further parallel channels each of which have two exits. The first channel is centrally fed. In the case of the example mentioned, it is possible to supply eight blow or injection heads arranged side by side in one plane. The difficulty in this embodiment is that it is complicated to clean the distributing device during system stoppage time. It is also complicated to produce the block because the channels are manufactured in the form of bores that have to be closed by plugs. The embodiment only takes into account blow or injection heads positioned in one plane.

SUMMARY

It is an object of the present disclosure to provide a multiple extrusion head with a plurality of extrusion heads that are arranged in at least two parallel rows. A mass entrance is connected to an extruder. The extrusion head can be easily produced and maintained.

In accordance with the disclosure, a multiple extrusion head for blow molding extrusion machines comprises a plurality of first extrusion heads. The first extrusion heads are fixedly arranged side by side in a first row to form a first plane. A plurality of second extrusion heads are fixedly arranged side by side in a second row. The second extrusion heads form a second plane extending parallel to the first plane. A first distributing device includes first distributing channels that are arranged in a plane corresponding to the first plane. One of the first channels is connected to a first extrusion head. All of the first distributing channels have a common first mass entrance. A second distributing device that includes second distributing channels is arranged in a plane corresponding to the second plane. Each of the second distributing channels is connected to a second extrusion head. All of the second distributing channels have a common second mass entrance. The first distributing device is separated in the region of the first plane. The second distributing device is separated in the region of the second plane. A third distributing device includes third distributing channels that are arranged in a third plane that extends at a right angle relative to the first plane and to the second plane. Two third distributing channels start from a third mass entrance. One of the two third distributing channels is connected to the first mass entrance. The further one of the two third distributing channels is connected to the second mass entrance. The third distributing device is separated in the third plane.

An advantage of this embodiment is that the first and second distributing devices are divided in the planes that are formed by the rows and where the channels are also positioned. The third distributing device is separated in a plane that is arranged transversely to the first and second distributing devices. Additionally, it contains the distributing channels that supply the distributing channels associated with the rows. Such separation results in a simplified production procedure because the individual channels can be continuously produced and they can extend in a way that avoids abrupt subdivisions. This means that the direction that the distributing channels extend can be selected so that the mass is uniformly distributed to the extrusion heads. A substantial advantage is that not only is it possible to supply a plurality of extrusion heads arranged side by side in one plane, but it is also possible to distribute the mass to a plurality of planes and rows, respectively, so that a plurality of extrusion heads can be arranged one behind the other and also side by side. Such a division simplifies the cleaning process. Additionally, the cross-sectional shape of the channels is not limited to a cylindrical bore.

According to a further embodiment, it is proposed that the third mass entrance forms a connection with an extruder It is advantageous if the first distributing channels and the second distributing channels are combined in pairs to form a main channel. Additionally, the main channels are each connected to the first mass entrance or to the second mass entrance. In this way, the length of the distribution path becomes advantageous.

Further, it is proposed that, per first plane and per second plane, four or more extrusion heads are provided.

The disclosure is not restricted to an arrangement in two planes. It can also be applied to three or more planes. Thus, for the first plane and for the second plane, at least one further parallel plane is provided. Extrusion heads are arranged in the planes with distributing devices that each comprise distributing channels and mass entrances that are designed in accordance with the first distributing device and that are divided in the corresponding further planes.

It is also possible for the first distributing device and the second distributing device and, optionally, further distributing devices, that are divided in planes extending parallel relative to one another, to be combined all together or in groups and form one unit.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

FIGS. 1 to 4 will be described jointly below. The illustrations in FIGS. 3 and 4 have been enlarged relative to FIGS. 1 and 2. In addition, the extension of the distributing channels has only been shown diagrammatically by dash-dotted lines in some areas. The cross-sectional shape of the individual distributing channels and the way in which it changes along the extension of the distributing channels is based on experimental know-how. However, the arrangement of the distributing channels in accordance with the disclosure enables a greater degree of freedom as regards to the cross-sectional shape.

The multiple extrusion head 1 as shown in the Figures includes first extrusion heads 2 that are arranged side by side in a first plane 3.

Figures 1, 2:
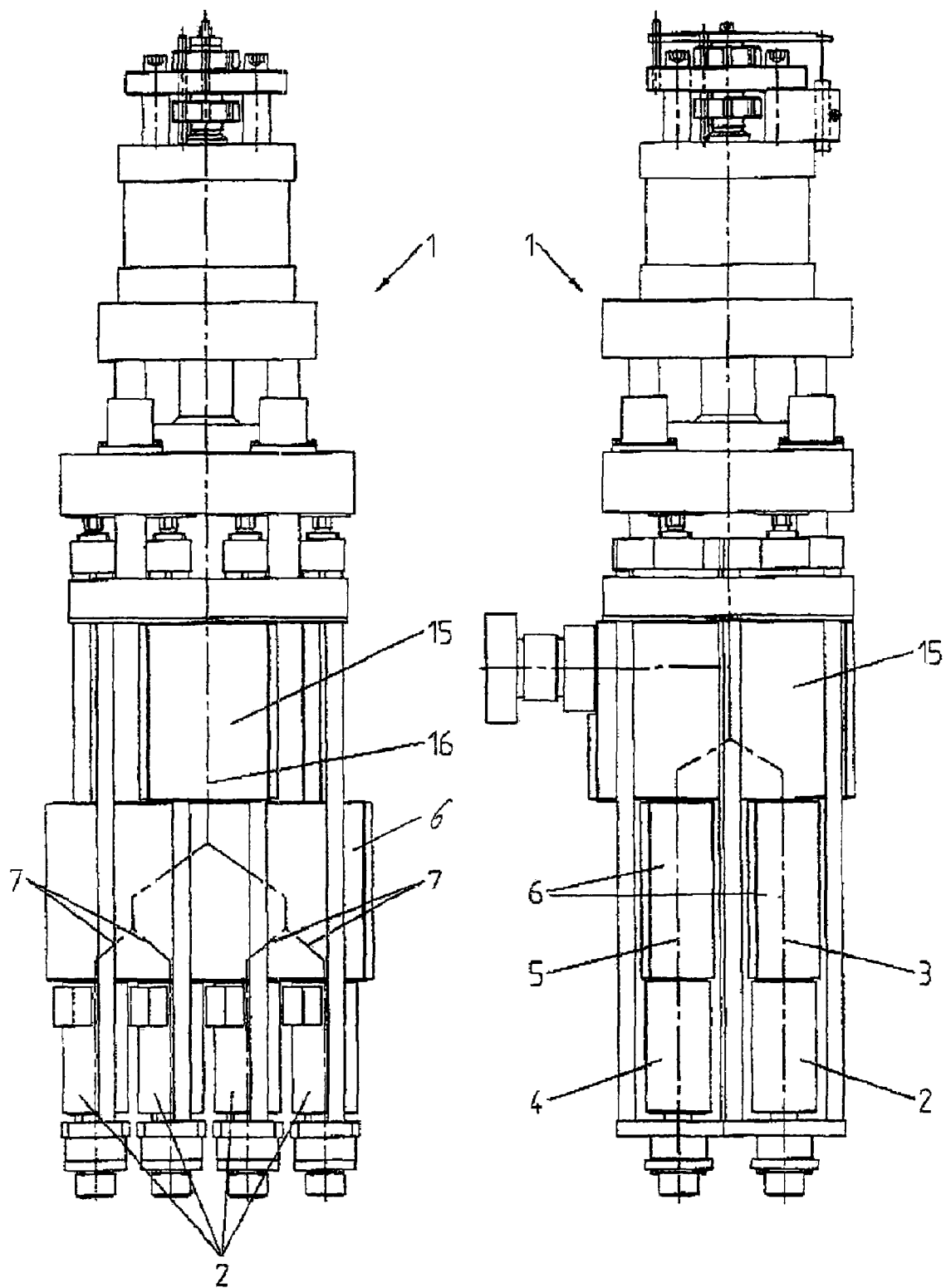
FIG. 1 is a front elevation view of a multiple extrusion head with a plurality of extrusion heads arranged side by side in a first plane.
FIG. 2 is a side elevation view of FIG. 1 showing extrusion heads arranged side by side in a second plane.
Figure 3:
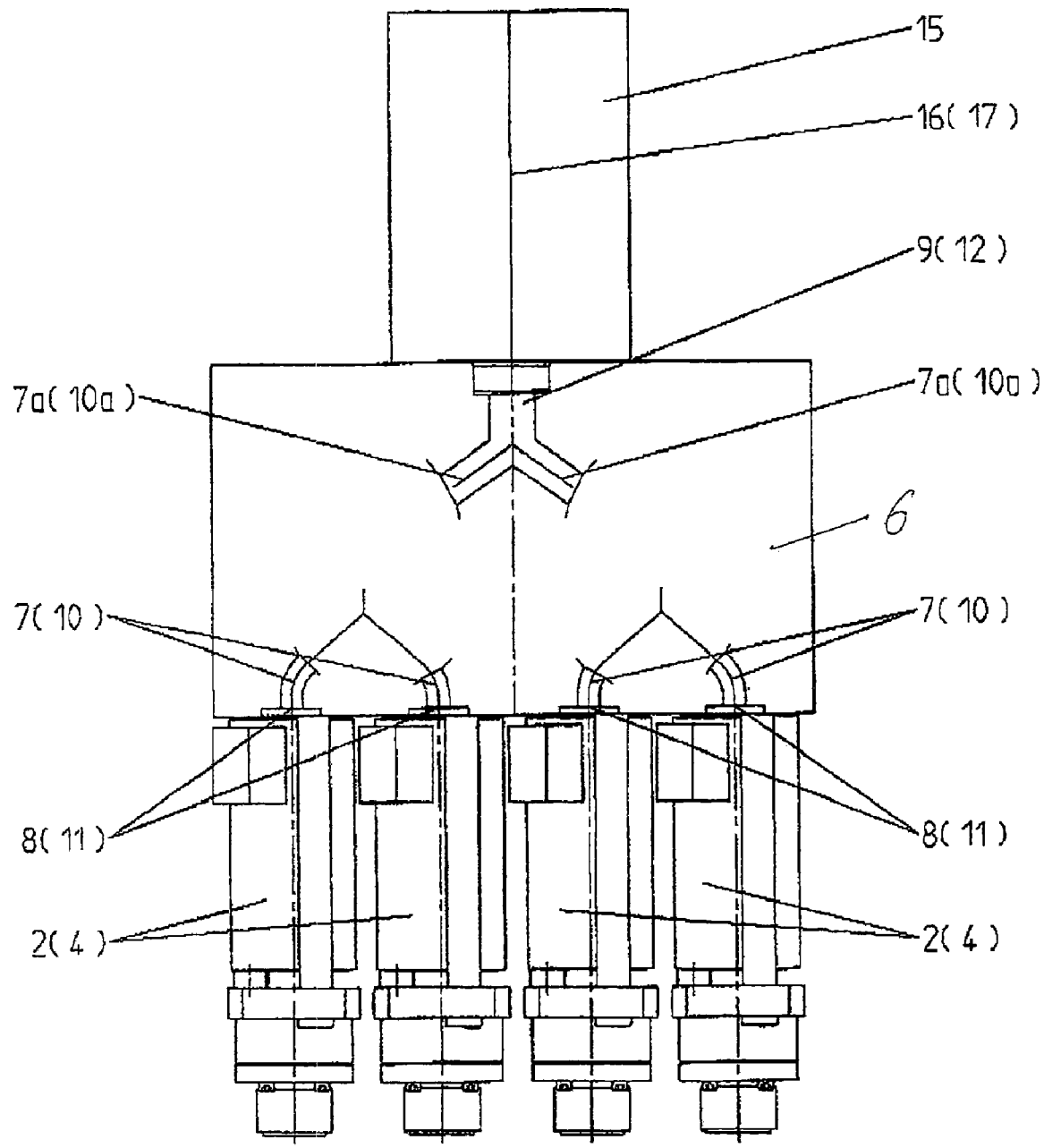
FIG. 3 is an enlarged view of the distributing devices shown in FIG. 1.
Figure 4:
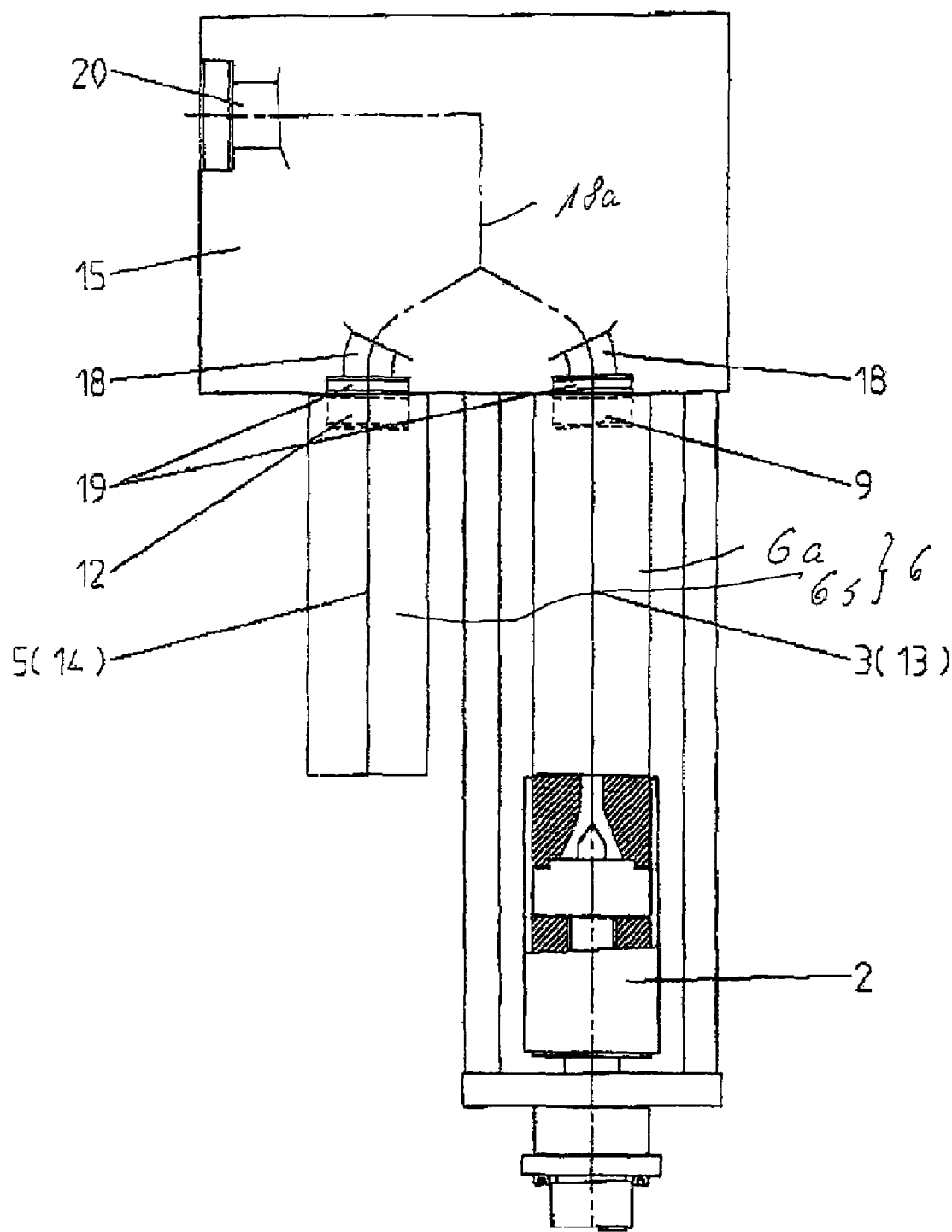
FIG. 4 is a side elevation view of FIG. 3.

FIGS. 1 and 3 only show the first extrusion heads 2 arranged side by side in the first row along the first plane 3. Second extrusion heads 4 are located in a second plane 5 behind the first plane 3 shown in FIGS. 1 and 3. The second plane 5 and the second extrusion heads 4, arranged grid-like therein relative to the first extrusion heads 2, can be seen in FIG. 2. However, it is only possible to see the first one of the second extrusion heads 4 associated with the second plane 5.

A first distributing device 6a, a second distributing device 6b and a third distributing device 15 supplies the first extrusion heads 2 and the second extrusion heads 4 with a plasticized mass flow of plastics. Additionally, they distribute the plastic to the extrusion heads 2 and 4.

The first distributing device 6a and the second distributing device 6b are identical in design. Thus, only the first one will be described below, by way of example. The two distributing devices 6a and 6b can be combined to form a distributing device 6. Thus, the channels for the two extend in a first and in a second row that include the first plane 3 and the second plane 5, respectively. As is particularly obvious from FIGS. 2 and 4, the first distributing device 6a and the second distributing device 6b are each provided with a plate-like structure. In each case, two individual plates 21, 22, 23, 24 abut one another in the respective planes, the first plane 3 and the second plane 5. The faces 25, 26, 27, 28 of the first distributing device 6a that face one another includes the first distributing channels 7. The second distributing device 6b includes the second distributing channels 10 that are associated with the second plane 5.

The first distributing channels 7, arranged in the first distributing device 6, end in a main channel 7a. The two main channels 7a are combined to form the first mass entrance 9. The second distributing channels 10, arranged in accordance with the first distributing device 6a, are combined to form a main channel 10a and a second mass entrance 12. The first mass entrance 9 and the second mass entrance 12 are located in planes that extend parallel relative to one another. They are offset relative to one another and are formed by the first separating join 13 of the first distributing device 6a and of the second distributing device 6b.

Towards the associated first extrusion heads 2 and the second extrusion heads 4, the first distributing channels 7 and the second distributing channels 10 include a first exit 8 and a second exit 11.

The first mass entrance 9 and the second mass entrance 12 located at a distance therefrom are supplied with a mass flow via a third distributing device 15. This is effected via two parallel third exits 19 that are combined to form a main channel 18a. The channel 18a and exits 19 are supplied by a common third mass entrance 20 that is connected to the extruder and is supplied with a plasticized mass flow of plastic.

The third distributing channels 18 are positioned in the third distributing device in a third plane 16 that extends at a right angle relative to the first plane 3 and to the second plane 5. In the third plane 16, the second distributing device 15, which also comprises a plate-like structure 31, 32, is divided by a third separating join 17. The third distributing channels 18 and the main channel 18a are worked into the abutting faces of the plates forming the third distributing device 15.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multiple extrusion head for blow molding extrusion machines comprises:
   a plurality of first extrusion heads fixedly arranged side by side in a first row to form a first plane;
   a plurality of second extrusion heads fixedly arranged side by side in a second row to form a second plane extending parallel to the first plane;
   a first distributing device with first distributing channels, the first distributing channels are arranged in a plane corresponding to the first plane and each first distributing channel is connected to a first extrusion head and all first distributing channels have a common first mass entrance;
   a second distributing device with second distributing channels, the second distributing channels are arranged in a plane corresponding to the second plane and each second distributing channel is connected to a second extrusion head and all second distributing channels have a common second mass entrance;
   the first distributing device is separated in a region of the first plane and includes a first pair of plates abutting one another in the first plane;
   the second distributing device is separated in the region of the second plane and includes a second pair of plates abutting one another in the second plane;
   said first and second pair of plates, respectively, forming said first and second distributing channels;
   a third distributing device with third distributing channels, the third distributing channels are arranged in a third plane extending at a right angle relative to the first plane and to the second plane, two third distributing channels start from a third mass entrance, one of the two third distributing channels is connected to the first mass entrance and the further one of the two third distributing channels is connected to the second mass entrance, and the third distributing device is separated in the third plane.

2. The multiple extrusion head according to claim 1, wherein the third mass entrance forms a connection with an extruder.

3. The multiple extrusion head according to claim 1, wherein the first distributing channels and the second distributing channels are each combined in pairs to form a main channel and the main channels are each connected to the first mass entrance or to the second mass entrance.

4. The multiple extrusion head according to claim 1, wherein per first plane and per second plane, four or more extrusion heads are provided.

5. The multiple extrusion head according to claim 1, wherein for the first plane and for the second plane at least one further parallel plane is provided with arranged extrusion heads whose distributing devices each comprise distributing channels and mass entrances designed in accordance with the first distributing device and are divided in the respective further planes.

6. The multiple extrusion head according to claim 5, wherein the first distributing device and the second distributing device and further distributing devices are divided in planes extending parallel relative to one another are combined all together or in groups and form one unit.

* * * * *